United States Patent [19]

Scott

[11] Patent Number: 6,149,347
[45] Date of Patent: Nov. 21, 2000

[54] METHODS OF LAYING SEABED PIPELINES

[75] Inventor: Philip Scott, Chichester, United Kingdom

[73] Assignee: Heerema Marine Contractors v.o.f., Netherlands

[21] Appl. No.: 09/152,496

[22] Filed: Sep. 9, 1998

[30] Foreign Application Priority Data

Mar. 25, 1998 [GB] United Kingdom .................... 9806410

[51] Int. Cl.⁷ ...................................................... F16L 1/12
[52] U.S. Cl. ........................... 405/167; 405/158; 405/166; 405/170
[58] Field of Search ..................................... 405/154, 158, 405/166, 167, 169, 170

[56] References Cited

U.S. PATENT DOCUMENTS

| 3,724,061 | 4/1973 | Schipper | 405/169 |
|---|---|---|---|
| 4,012,919 | 3/1977 | Rosa et al. | 405/166 |
| 4,117,692 | 10/1978 | Oberg | 405/166 |
| 4,433,938 | 2/1984 | Boon | 405/166 |
| 5,380,129 | 1/1995 | Maloberti et al. | 405/166 |
| 5,421,675 | 6/1995 | Brown et al. | 405/170 |
| 5,823,712 | 10/1998 | Kalkman et al. | 405/165 |

*Primary Examiner*—Thomas B. Will
*Assistant Examiner*—Gary S. Hartmann
*Attorney, Agent, or Firm*—Fulwider Patton Lee & Utecht, LLP

[57] ABSTRACT

The disclosure relates to a method of laying a seabed pipeline from a surface vessel (10, 11) in which the vertically oriented lengths of pipe are assembled to form pipe strings suspended vertically from the vessel extending towards the seabed. An end (30) of a previously laid length of pipeline(29) is supported above the seabed by a tether (28) extending to the surface vessel to locate an upwardly facing end of the pipeline at a predetermined level below the vessel corresponding generally to the length of the pre-assembled pipe strings. A further pipe string (31) is then maneuvered from the vessel until the lower end of the string is aligned with the end of the pipeline, after which the pipe string is lowered to engage its lower end with the upwardly facing end of the pipeline. The pipe string is connected to the pipeline to form a further part of the pipeline, and the tether from said end of the pipeline is then released and re-attached to the upper end of the newly attached length of pipeline to support the pipeline suspended from the vessel. The vessel is then moved in the direction in which the pipeline is to be laid and at the same time the newly attached pipe string is lowered by paying out the tether from the vessel to lay the pipeline on the seabed until the upper end of the pipeline reaches said predetermined level. The vessel is then stopped with the upper end of the pipeline supported by the tether above the seabed and facing upwardly ready to receive the next pipe string.

5 Claims, 4 Drawing Sheets

FIG. 3.
FIG. 4.
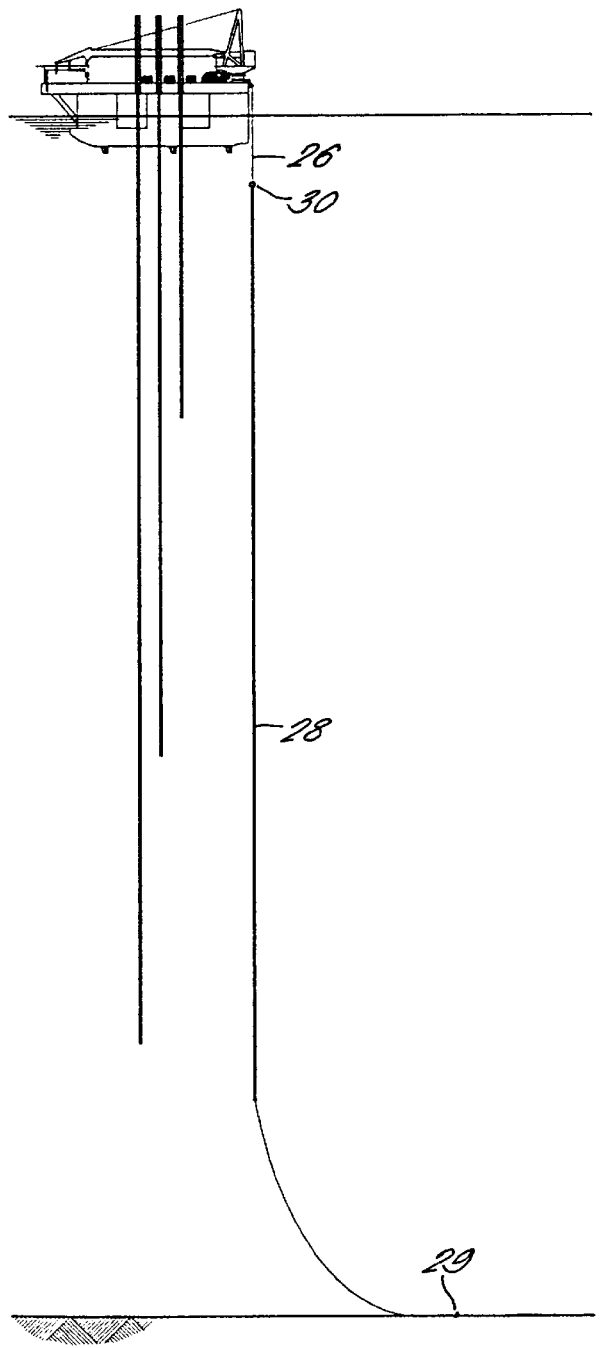
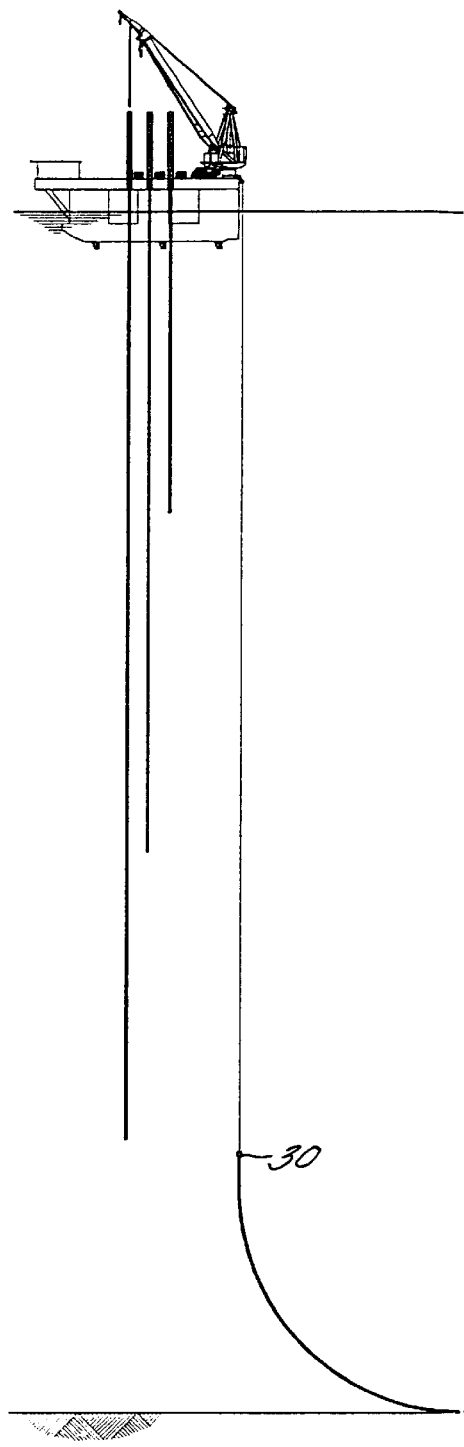

METHODS OF LAYING SEABED PIPELINES

BACKGROUND OF THE INVENTION

1. Field of the Invention

This invention relates to methods of laying seabed pipelines from a surface vessel.

The invention is particularly, although not exclusively, applicable to laying pipelines in deepwater locations. Such pipelines are usually formed from lengths of steel pipe having a corrosion resistant coating such as an epoxy coating and are joined together by welding or snap connectors. It is not usually necessary to provide such pipelines with concrete coatings for protection because of the depth of the seabed.

2. Background Prior Art

In the production and laying of seabed pipeline, for the transportation of oil or gas from a vessel onto the sea bottom three basic methods are commonly used:

1. S-lay

The pipeline leaves the layvessel in a substantially horizontal orientation, bends downwards over a supporting structure, the so-called stinger, and when approaching the sea bottom bends upwards to be laid on the sea bottom. The sideview of the pipeline being laid shows an S, the shape dependant on pipe weight, water depth and the tension applied to the conduit. For a typical example see U.S. Pat. No. 3,715,890.

The advantage of this method is its relatively high production speed in case the conduit is composed of steel pipes to be welded together and the vessel is long enough to deploy an economic number of welding stations. The disadvantage, however, is that for very deep water either the tension to be applied to the conduit will become too high or a stinger of such a size is required that it is not feasible anymore to connect such a stinger to the vessel.

2. J-Lay

The pipeline leaves the lay vessel in an inclined or even near vertical orientation in order to allow the laying of pipelines in deep water without stressing the pipeline material excessively. This method is explained in U.S. Pat. Nos. 3,266,256 and 3,389,563. The method can also be used in shallow water as illustrated in an article entitled "*The one-ship work fleet*", published, in Ocean Industry of March 1970, pages 52–54.

A particular disadvantage of this method is the relatively slow production speed because it is often only possible to work in only one welding station which reduces the production speed significantly compared with the S-lay method where welding is done in a number of welding stations.

3. Reel-lay

Reel-lay can be considered as a variation on J-lay because the conduit leaves the lay vessel in an inclined or even near vertical orientation but in reel-lay a length of pipeline is held in a storage reel to be unreeled at site. This method gives a very high lay speed and is obviously advantageous when a flexible pipeline or cables have to be laid. Examples of this method can be found in U.S. Pat. No. 3,389,563, FIG. 4 and U.S. Pat. No. 4,340,322 which describe a self-propelled reel pipe laying ships. A disadvantage of this method relates to the limited capacity of the reels, necessitating regular reloading or change out of reels when a long pipeline is being laid.

Ideas to overcome some disadvantages related to the above mentioned lay methods and combining the advantages of the same are given in WO 95.25237. To limit the bending radius of the steel pipe and hence to limit the diameter of the reel or other curved guiding means, a certain plastic deformation of the pipeline is allowed. This normal procedure when using the reel-lay method however requires expensive straightening means to straighten the pipeline after this member has left the reel or any other curved part having introduced the plastic deformation of the pipeline. Other disadvantages of the proposed methods in WO 95/25237 are the necessity to bend and straighten the pipeline more than once (shown in FIGS. 4 and 5) or that a certain fleet angle is required to allow the vertical part of the pipeline to pass the horizontal part of the pipeline.

SUMMARY OF THE INVENTION

The invention provides a method of laying a seabed pipeline from a surface vessel comprising the steps of assembling vertically oriented lengths of pipe to form pipe strings suspended vertically from the vessel extending towards the seabed, suspending an end of a previously laid length of pipeline above the seabed by a tether extending to the surface vessel to locate an upwardly facing end of the pipeline at a predetermined level below the vessel corresponding generally to the length of the pre-assembled pipe strings, manoeuvring a pipe string from the vessel until the lower end of the string is aligned with the end of the pipeline, lowering the pipe string to engage its lower end with said upwardly facing end of the pipeline and connecting the pipe string to the pipeline to form a further part of the pipeline, releasing the tether from said end of the pipeline and re-attaching the tether to the upper end of the newly attached length of pipeline to support the pipeline suspended from the vessel, moving the vessel in the direction in which the pipeline is to be laid and at the same time lowering the pipeline by paying out the tether from the vessel to lay the pipeline on the seabed until the upper end of the pipeline reaches said predetermined level and stopping movement of the vessel with the upper end of the pipeline supported by said tether above the seabed and facing upwardly ready to receive the next pipe string.

For the first pipe string to be laid, the lower end of the pipe string may be connected by an anchor to the seabed to guide the end of the pipeline onto the seabed along the required path as the vessel advances and the hoist supporting the upper end of the pipe string is payed out.

Preferably a plurality of vertically extending pipe strings are assembled suspended from the vessel for attachment to the pipeline.

BRIEF DESCRIPTION OF THE DRAWINGS

The following is a description of a specific embodiment of the invention, reference being made to the accompanying drawings in which:

FIGS. 3 to 5 illustrate diagrammatically the sequence of operations in laying a pipeline from the vessel.

DESCRIPTION OF THE PREFERRED EMBODIMENTS

Figure 1:
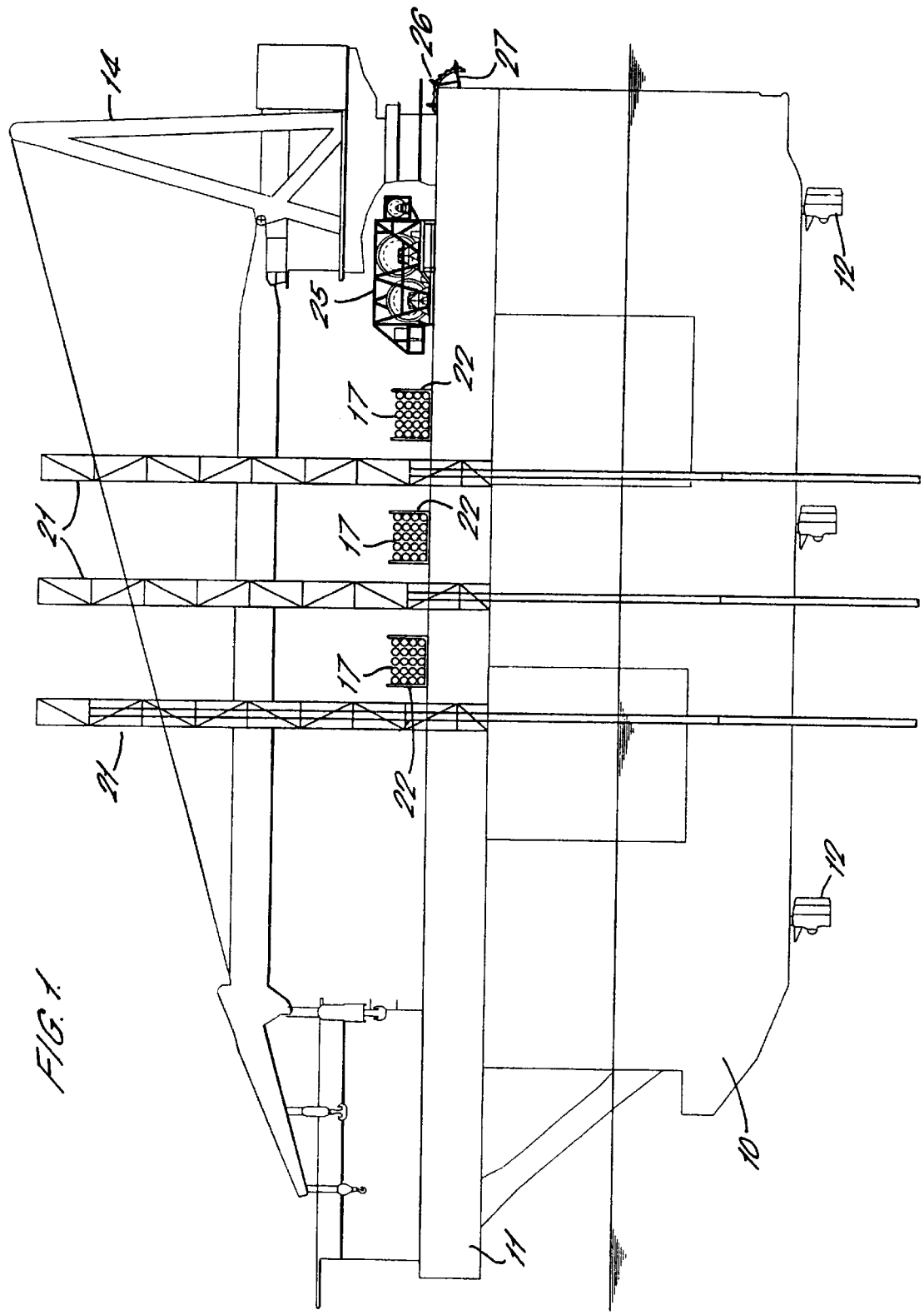
FIG. 1 is a side view of a surface vessel for laying a seabed pipeline.
Figure 2:
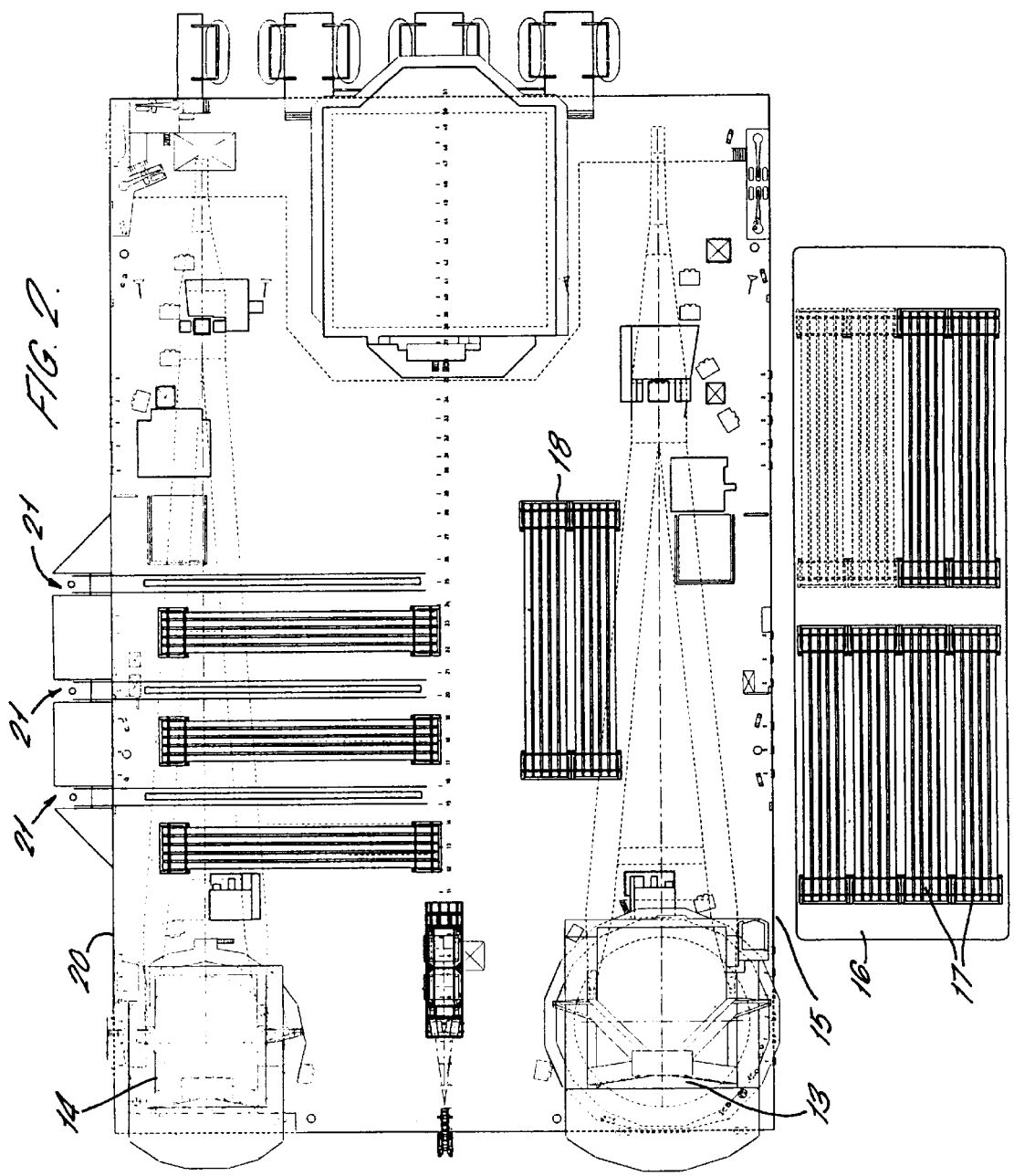
FIG. 2 is a plan view of the deck of the vessel.

Referring firstly to FIG. 1 of the drawings, there is shown a vessel indicated generally at 10 for laying a pipeline having a deck 11 and thrusters 12 for propelling/manoeuvring the vessel.

The vessel has cranes 13,14 on either side of the vessel for lifting and manoeuvring pipes and pipe strings. One side 15 of the vessel is reserved for receiving supplies of pipe. The drawing shows a supply barge 16 on which pipes 17 are stacked for delivery to the vessel. The deck 11 of the lay vessel has support frames 18 to which the pipes are transferred from the supply barge.

The other side 20 of the vessel has three spaced pipeline assembly stations. Each assembly station has a pivoting boom structure 21 pivotally at deck level to tip between a horizontal position in which a pipe length is loaded into the boom and a vertical position. The raising and lowering is performed by the adjacent crane 14. On the side of the vessel immediately below each boom structure there is a pipe clamping mechanism to hold an upper end of a length of pipe suspended from the vessel. Supply frames 22 filled with pipe lengths 17 transferred from the stacks 18 are located between the boom structures. Pipes are loaded one at a time into the boom structures with the boom structures horizontal. A boom structure is then raised into the vertical position by the crane and locked upright. The pipelength supported by the boom is then lowered using the crane 14 into engagement with the upper end of the previously placed pipelength supported by the clamping mechanism. The adjacent ends of the pipe are then coupled by an automatic coupling device or are welded together and a coating applied over the joint to seal the joint. The clamping mechanism is then operated to lower the pipe string until the upper end of the pipe is below the boom structure and in a position to receive the next pipe length. The clamping mechanism for the pipe string is then braked to support the pipe string whilst the boom structure is lowered to the vessel deck. Another pipe length is located in the boom and the boom lifted to the vertical for attachment of the further pipe length to the pipe string. The procedure continues until a pipe string of the required length has been assembled.

A winch 25 is mounted on the deck of the vessel towards its stern from which a cable 26 extends over a cable guide 27 on the stern of the vessel to take the cable away from the stern. The cable is used to temporarily support the end of the previously laid length of pipeline before the next pipe string is attached to it as described below.

Figure 5:
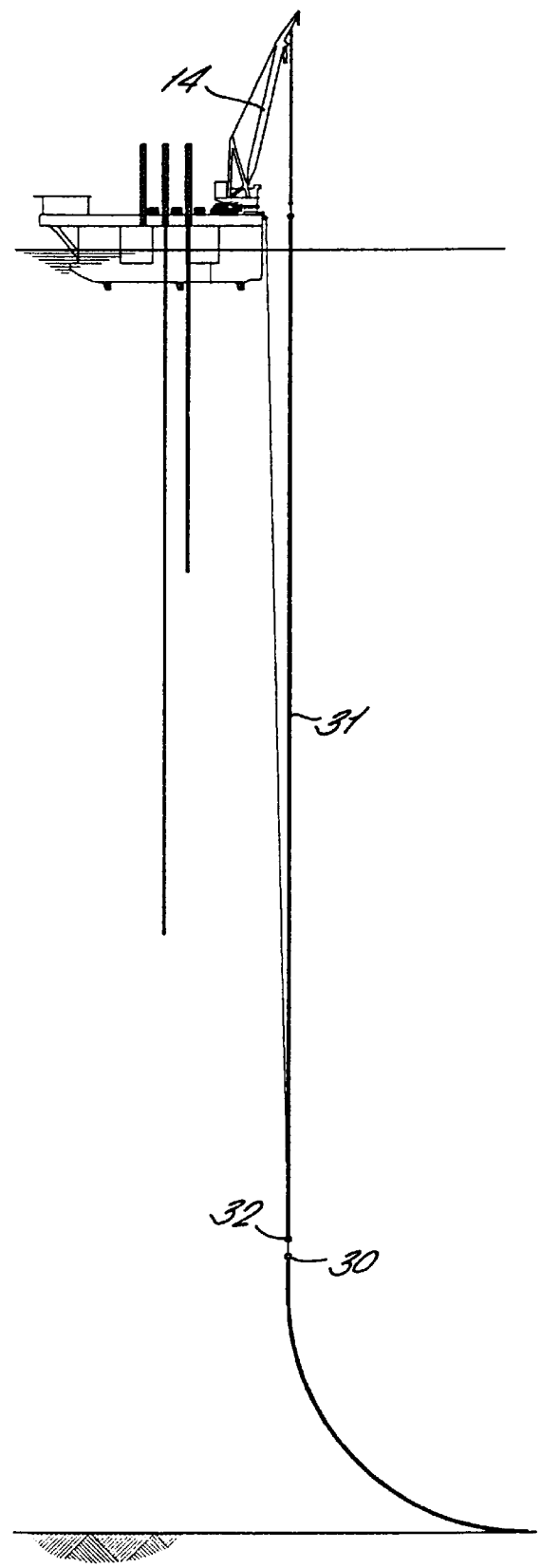

Reference will now be made to FIGS. 3 to 5 which illustrate the operation of the vessel in laying a subsea pipeline.

In FIG. 3, a side view of the barge is shown with three pipe strings in the course of completion. A previously completed pipe string 28 is suspended by the hoist over the stern of the vessel and the lower end of the pipe string is connected by an anchor 29 to the seabed to locate the pipe string as required. The vessel moves forwardly in the direction of lay and the hoist is payed out to lower the pipe string on the sea bed until the upper end 30 of the pipe string is located at a level corresponding to the length of the pipe string. The vessel is then stopped and the hoist braked. A further pipe string 31 is then manoeuvred using the crane 13 to bring it into line with the end of the previously laid pipe string with the lower end 32 of the new pipe string 31 over the end 30 of the previously laid pipe string. The crane then lowers the new pipe string until the lower end of the pipe string is aligned with the open end of the previously laid pipeline and is then stabbed into engagement with the open end to cause an automatic coupling device to lock the pipe ends together. The tether is the detached, recovered and re-attached to the upper end of the further pipe string.

Movement of the vessel is then re-started and the tether payed out from the hoist to lower the new pipe string to the seabed until the upper end of the pipe string reaches the approximate level referred to above corresponding to the made up length of pipe string. A further length of pipe string is then manoeuvred into place over the end of the pipeline using the crane and the lower end of the pipe string is attached to the upper end of the pipeline using an automatic connector. The end of the hoist cable is then detached from the end of the pipeline, reeled in and re-attached to the upper end of the newly connected pipe string to allow the crane hoist to be disconnected. The vessel is then advanced as before and the cable hoist payed out until the upper end of the pipe string reaches said determined level corresponding to the length of a made up pipe string. The vessel is then halted and pay out from the hoist ceases whilst another pipe string is manoeuvred into place by the crane and attached to the upper end of the pipeline ready to continue the pipelaying operation.

What is claimed is:

1. A method of laying a pipeline from a surface vessel along a requisite path on a seabed, said method comprising the steps of assembling vertically oriented lengths of pipe to form pipe strings, having upper and lower ends suspended vertically from the vessel extending towards the seabed, suspending an upwardly facing end of a previously laid length of pipeline above the seabed at a level below the vessel corresponding generally to the length of one of said pre-assembled pipe strings by a tether extending to the surface vessel, maneuvering one of said vertically oriented pipe strings from the vessel until said lower end of the string is aligned with said upwardly facing end of the pipeline, lowering the pipeline to engage said lower end with said upwardly facing end of the pipeline and connecting the pipe string to the pipeline to form a further part of the pipeline, releasing the tether from said end of the of pipeline and re-attaching the tether to the upper end of the newly attached length of pipeline to support the pipeline suspended from the vessel, and at the same time moving the vessel in the direction of said requisite path and lowering the pipeline by paying out the tether from the vessel to lay the pipeline on the seabed until the upper end of the pipeline reaches said predetermined level, and stopping movement of the vessel with said upper end of the pipeline supported by said tether above the seabed and facing upwardly ready to receive the next pipe string.

2. A method as claimed in claim 1, wherein, for the first pipe string to be laid, the lower end of the pipe string is connected by an anchor to the seabed to guide the end of the pipeline onto the seabed along said requisite path as the vessel advances and the tether supporting the upper end of the pipe string is payed out.

3. A method as claimed in claim 1, wherein a plurality of vertically extending pipe strings are assembled suspended from the vessel for attachment to the pipeline.

4. A method as claimed in claim 1, wherein the tether is wound up and paid out from a hoist on the vessel.

5. A method as claimed in claim 1, wherein a pipe string to be connected to the pipeline is suspended from a crane on the vessel before attachment to the pipeline and transfer to the tether for lowering to the seabed.

* * * * *